(No Model.)

D. W. BICKERSTAFF.
SHEEP FEEDING RACK.

No. 333,722. Patented Jan. 5, 1886.

WITNESSES
Percy E. Bowen.
E. G. Siggers.

INVENTOR
D. W. Bickerstaff,
By C. A. Snow & Co.
his Attorneys

UNITED STATES PATENT OFFICE.

DOCTER W. BICKERSTAFF, OF COCHRANTON, PENNSYLVANIA.

SHEEP-FEEDING RACK.

SPECIFICATION forming part of Letters Patent No. 333,722, dated January 5, 1886.

Application filed August 7, 1885. Serial No. 173,856. (No model.)

*To all whom it may concern:*

Be it known that I, D. W. BICKERSTAFF, a citizen of the United States, residing at Cochranton, in the county of Crawford and State of Pennsylvania, have invented a new and useful Improvement in Sheep-Feeding Racks, of which the following is a specification, reference being had to the accompanying drawings.

My invention relates to an improvement in sheep-feeding racks; and it consists in the peculiar construction and combination of devices that will be more fully set forth hereinafter, and particularly pointed out in the claims.

Figure 1:
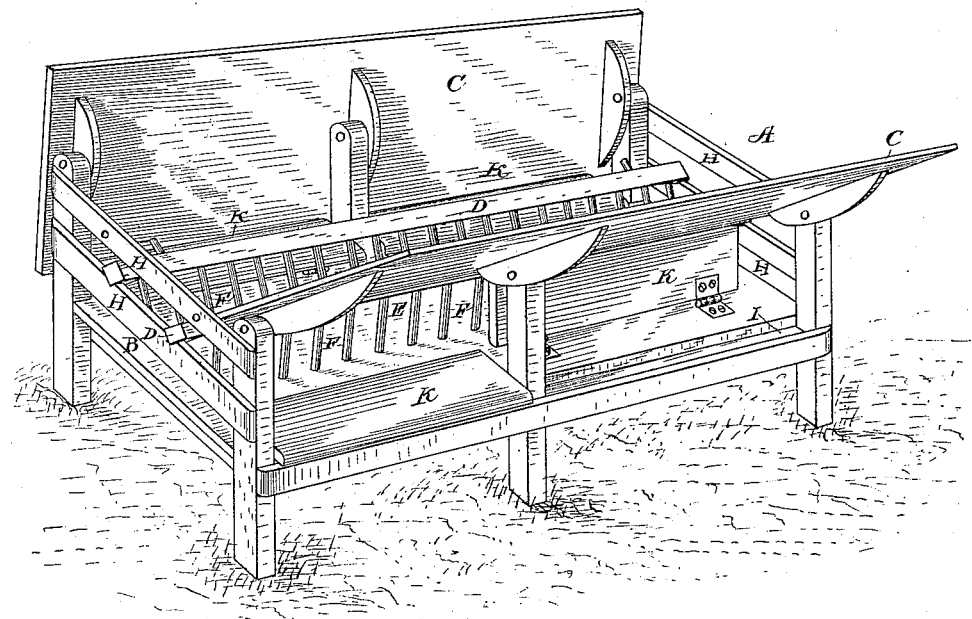
Figure 2:
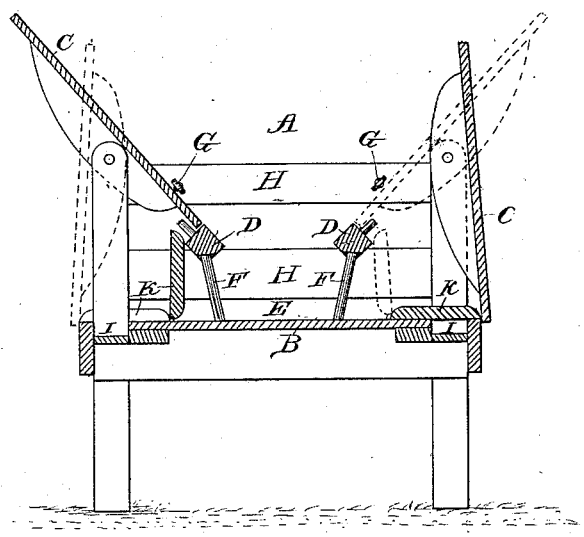

In the accompanying drawings, Figure 1 is a perspective view of a sheep-feeding rack embodying my invention, one of the leaves being closed and one open, and one of the grain-lids being also open, the remaining grain-lids being closed. Fig. 2 is a vertical transverse sectional view of the same, showing the leaves and lids in the same positions.

A represents a rectangular frame having a platform or bed, B, which is at a suitable height from the ground. To the vertical uprights at the sides of the frame are pivoted leaves C, which are adapted either to be folded down against the outer sides of the vertical uprights, so as to form sides for the bed, or to be folded in over the upper ends of the vertical uprights with their inner edges resting on longitudinal bars D, that extend through the rack above the platform. These bars are arranged one on either side of the center of the platform and at a suitable distance from the outer sides of the frame, so as to form a hay-rack, E, in the center of the frame, the sides of the hay-rack being formed by the outwardly-inclined rungs F, which are placed at a suitable distance apart.

When the leaves are open, the sheep can have access to the hay in the rack. The leaves when in this position are inclined, and extend upwardly and outwardly beyond the sides of the frame and form a guard to prevent hay-seeds, dust, or dirt from falling upon the sheep while eating and thus soiling their wool. Removable pins G are inserted in openings in the upper horizontal end bars, H, of the frame, and secure the leaves in position when the rack is open.

When the leaves are folded down against the sides of the frame, the sheep are excluded from the rack, thus permitting it to be filled without the annoyance of the sheep crowding and jostling in struggles for food.

In the sides of the platform are formed grain-troughs I, which are of suitable size, and are provided with hinged lids K. These lids may be opened and folded back against the sides of the hay-rack so as to give the sheep access to the grain, or be closed down over the troughs to exclude the sheep therefrom.

A sheep-feeding rack thus constructed enables sheep to be fed either grain or hay without waste and without soiling their wool, and enables the sheep to be excluded from the rack while food is being put into it.

I make no claim, broadly, to a rack having leaves adapted to be opened to permit access of the sheep to the feed, and to be folded down to form sides for the rack and exclude the sheep therefrom, as this, I am aware, is not novel.

My invention differs from the racks heretofore constructed in that in the latter when the leaves are folded inwardly to admit the sheep to the rack the leaves cover the rack and render it necessary to swing the leaves open in order to replenish the rack, while by my construction the leaves when folded inwardly only reach the top edges of the rack and extend outwardly and upwardly therefrom, thus leaving the top of the rack open and enabling it to be readily refilled. Moreover, the leaves when in this position form a sort of hopper to direct the hay or straw directly into the rack, thus preventing any of it from being wasted.

Having thus described my invention, I claim—

1. The frame having the uprights at the sides and a longitudinal rack, E, along the center, comprising the rungs or short bars F and the connecting longitudinal bars D, in combination with the swinging leaves C, pivoted to the upper ends of the side uprights and folding inward over the frame so as to rest at their inner ends on and be supported by the bars D of the rack E, as set forth.

2. The frame having the uprights at the sides and the rack in the center, in combination with the leaves pivoted to the upper ends of the uprights to form sides for the frame when in a vertical position, the said leaves when folded inwardly reaching the sides or top edges of the rack and extending outwardly and upwardly therefrom, and projecting beyond the outer sides of the frame, substantially as described.

In testimony that I claim the foregoing as my own I have hereto affixed my signature in presence of two witnesses.

DOCTER W. BICKERSTAFF.

Witnesses:
JAMES GRAHAM,
W. H. FIRST.